Inventor:
Robert W. Love
by Otto Tichy
His Attorney

United States Patent Office 3,160,339
Patented Dec. 8, 1964

3,160,339
APPARATUS FOR SCORING AND BREAKING LENGTHS FROM AN ELONGATED VITREOUS BODY
Robert W. Love, Cleveland Heights, Ohio, assignor to General Electric Company, a corporation of New York
Filed Nov. 24, 1961, Ser. No. 154,514
7 Claims. (Cl. 225—96.5)

The present invention relates to apparatus for severing lengths of predetermined size from vitreous tubing or rod continuously formed and drawn as by a glass tubing and rod forming and drawing machine of the type disclosed and claimed in the Danner Patent No. 1,218,598, patented March 6, 1917.

The principal object of the invention is to provide a high-speed severing apparatus for continuously formed vitreous tubing or rod which is positive in action, readily adjustable for severing tubing or rod within a selected range of diameters and adaptable for severing such tubing or rod into lengths of different sizes. Further objects and advantages of the invention will appear from the following detailed description of the preferred embodiment thereof.

In accordance with these objects the severing means includes a cutting wheel mounted for rotation on the free end of an arm swung on the rim portion of a rotatable disc so as to be movable from one side to the other of a circumferential line on the disc to which is tangent the linear path of elongated straight glass tubing, for example, fed longitudinally to the apparatus. The disc engages the tubing travelling along the linear path and is driven at a circumferential speed corresponding to the linear speed of the fed tubing. The severing means is mounted on the disc in such manner that the edge of the cutting wheel projects beyond the said circumferential line a sufficient distance to score transversely the drawn tubing engaged by the disc as the wheel carrying arm of the severing means is caused to swing on the disc to move the cutting wheel from one side to the other of the circumferential line on the disc. The cutting wheel is carried by the disc in a circular path at a speed corresponding to the linear speed of the tubing and scores the tubing transversely in the region of the point of tangency of the tubing with the periphery of the disc as it is moved from one side to the other of the linear path of the drawn tubing. The depth of the score made by the cutting wheel is controlled by shifting the location at which the cutting wheel scores the tubing with respect to the point of tangency of the tubing with the periphery of the disc.

The axis of rotation of the cutter wheel on the free end of the arm, the pivotal axis of the arm on the disc and the longitudinal axis of the tubing are in a common plane normal to the axis of rotation of the disc when the wheel is at its point of deepest penetration into the tubing to provide a solid support for the cutting wheel.

The disc carrying the cutting wheel is adjustable with respect to the path of travel of the drawn tubing from the tractor of the drawing machine so that tubing of different diameter may be severed by the apparatus. Another disc mounted opposite the cutting wheel carrying disc with respect to the linear path of the tubing is spring pressed toward the latter to maintain firm contact between the drawn tubing and the peripheries of both discs. The drawn tubing may be cut into selected lengths by increasing or decreasing the diameter of the disc on which the cutting wheel is mounted or by increasing the number of cutting wheels mounted on the disc, or both may be used when desired.

In the drawings accompanying and forming part of this specification:

FIG. 3 is a fragmentary, side elevational view also on an enlarged scale of the cutting wheel and the mount therefor on one of the discs of the apparatus shown in FIG. 1.

FIG. 4 is a perspective view on the same scale as FIG. 1 of sprockets and chains of the drive for the apparatus.

Figure 1:
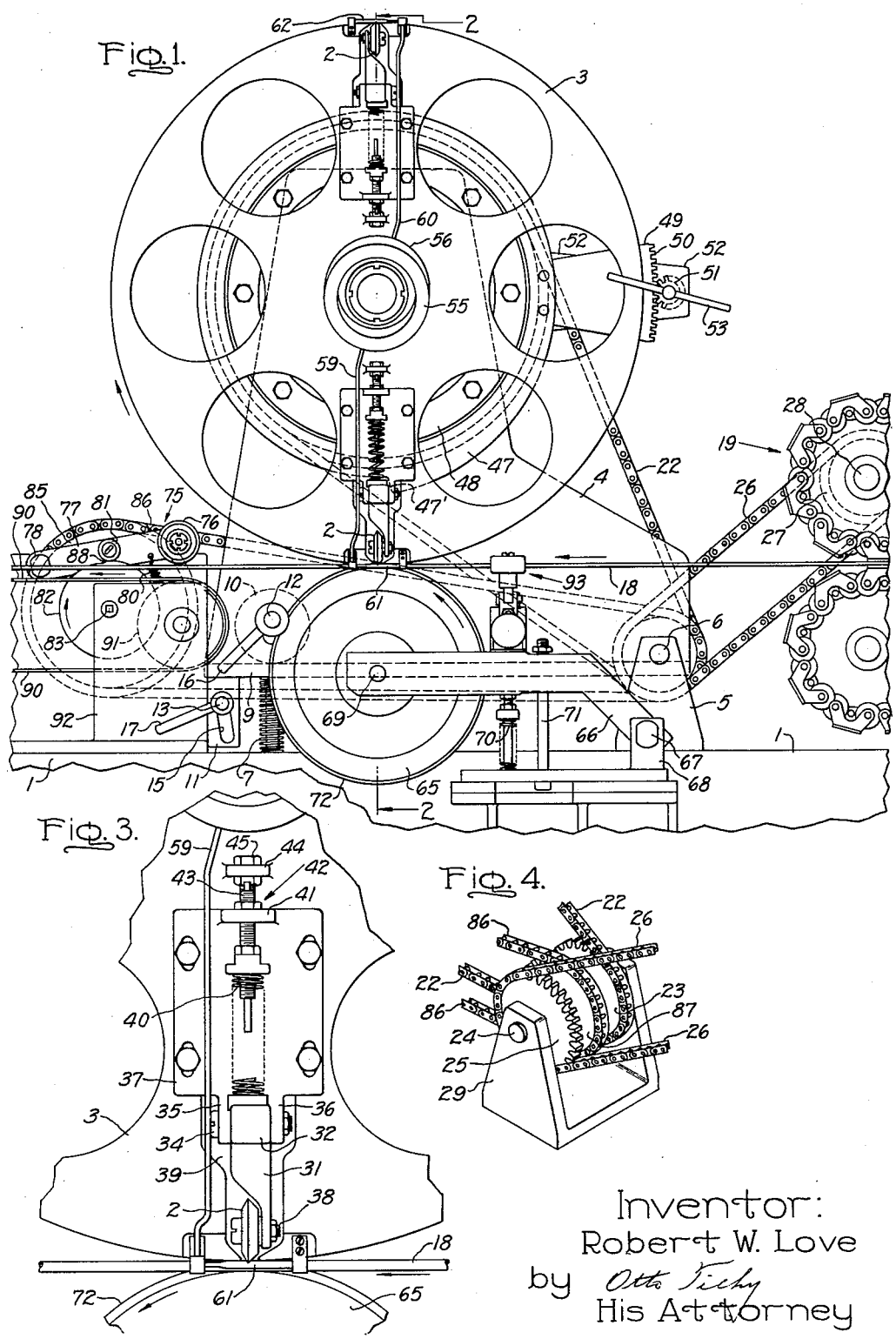
FIG. 1 is a side elevational view of a severing apparatus embodying the invention showing the continuously formed and drawn tubing passing through the apparatus from the tractor of the tube drawing machine to the conveyor for the lengths of tubing severed from the continuously drawn tubing by the apparatus.

Referring to the drawings, the severing apparatus is mounted on a base 1. An assembly including the subassembly of the cutting wheels 2 and the mounts therefor, the carrying disc 3 for the subassembly, the drive means for the disc 3 and a U-shaped support 4 for the disc 3 is mounted on a pair of spaced apart upright members 5 affixed to the base 1. One only of the upright members 5 has been shown in FIG. 1 of the drawings but it will be understood that the other of these members is in line with the member 5 shown.

The support member 4 of the assembly is mounted at one end on a horizontal axle 6 supported at opposite ends by the supports 5 in such manner that the support 4 is movable around the axle 6 as an axis when the opposite end of the support 4 is raised or lowered. Thus the height of the disc 3 may be adjusted so that the disc may be brought into engagement with the topside of the drawn tubing to be severed. Such adjustments are made when tubing of different diameters within the range of diameters is to be severed.

The opposite end of the support member 4 for the disc 3 is supported by a plurality of coiled springs 7 bearing against the base 1 and mounted around studs 8 affixed to the bottom plate 9 of the support member 4. The disc 3, which has a plurality of circular holes therein for weight reduction, is shown in its lowermost position in the drawings. When tubing of larger diameter than the tubing 18 shown in the drawings is to be severed by the apparatus, the disc 3 may be raised by raising the spring supported end of the support member 4.

Figure 2:
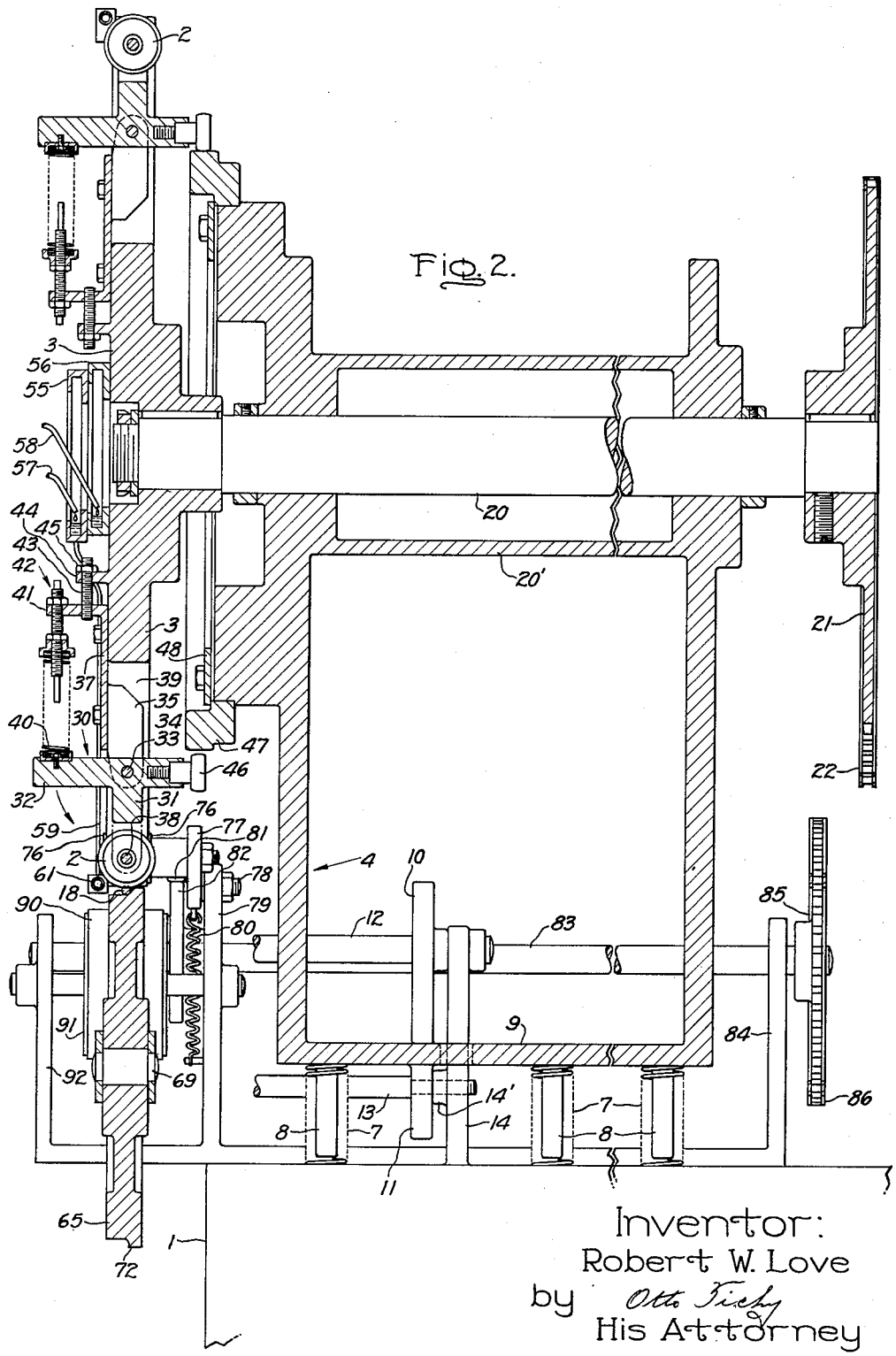
FIG. 2 is a sectional view on an enlarged scale of the apparatus shown in FIG. 1 taken along the line 2—2 of FIG. 1.

The spring supported end of the support member 4 may be raised from the position shown in the drawings by turning the eccentric circular cam 10 engaging the top face of the plate 9 after releasing the slotted tongue 11 which is integral with and extends downwardly from the plate 9. The circular cam 10 is eccentrically mounted on the shaft 12. During operation of the apparatus the member 4 is held in fixed position by the tongue 11 which is clamped by the shouldered screw 13 against the upstanding member 14 integral with the base 1. The member 14 extends through an opening in the bottom plate 9 and the cam shaft 12 is journalled to the upper end of the upright member 14 as shown in FIG. 2. The slot 15 in the tongue 11 is shown in FIG. 1 which shows also the handle 16 affixed to the shaft 12 and the handle 17 affixed to the screw 13. The position of the disc 3 may be changed when desired by manually turning the handle 17 to turn the screw 13 in the threaded portion of the upstanding member 14 to release the tongue 11, then manually turning the handle 16 affixed to the shaft 12 to rotate the cam 10 so that the springs 7 are free to press upwardly the spring supported end of the support member 4. After the periphery of disc 3 has been raised to the proper height so as to engage the upper side of the tubing of larger diameter to be severed, the tongue 11 is clamped by the shouldered screw 13 against the abutment 14′ on the member 14 by turning the handle 17 in the proper direction. The support for the outer ends of shaft 10 and screw 13 have been omitted from the drawings for simplicity in illustration.

The disc 3 is driven at a peripheral speed corresponding to the linear speed of the drawn tubing 18 fed to the apparatus by the tractor 19 of the tube drawing machine through the shaft 20 extending through shaft housing 20' and journalled on the support member 4 as shown in FIG. 2, the sprocket 21 affixed to the end of the shaft 20 opposite the end to which the disc 3 is affixed, the chain 22 which engages the sprocket 21 and a sprocket 23 keyed to the shaft 24 located directly behind the support member 5 in the view of FIG. 1 and shown in FIG. 4 of the drawings. The sprocket 25 engaged by the chain 26 which meshes with the sprocket 27 on the tractor 19 is also keyed to the shaft 24. The sprocket 27 is affixed to the drive shaft 28 of the tractor 19 which is connected to the drive motor (not shown) for both the tractor and the severing apparatus. The shaft 24 is journalled to the arms of bracket 29 affixed to the base 1. An extension of the axis of shaft 24 coincides with the axis of axle 6 on which support 4 is pivoted so that the drive chain 22 is not affected by the setting of the disc 3 for tube diameter changes. The relative sizes of the sprockets 21, 23, 25 and 27 are selected so that the disc 3 is driven at a peripheral speed corresponding to the linear speed of the drawn tubing 18 fed to the severing apparatus by the tractor 19 and travelling longitudinally in the direction shown by the arrow in FIG. 1.

The two subassemblies including the cutting wheels 2 carried by the disc 3 are mounted in diametrically opposite positions on the peripheral portion of the disc. The subassemblies are of identical structure and it will be understood that the following description of the subassembly shown severing the drawn tubing 18 in FIGS. 1, 2 and 3 of the drawing applies also to the subassembly shown at the top of FIGS. 1 and 2.

Each subassembly including a cutting wheel 2 comprises a T-shaped piece 30 having three arms 31, 32 and 33. As shown in FIG. 2, the arm 31 carries at its free end the cutting wheel 2 and the arms 32 and 33 are normal to the arm 31. The arms 32 and 33 thus constitute lateral extensions of arm 31. The T-shaped piece 30 is pivotally mounted on an axle 34 supported by brackets 35 and 36 integral with plate 37 bolted to the outer face of the disc 3. The cutting wheel 2 is mounted on an axle 38 affixed to the free end of arm 31 in such manner that the axis of rotation of the cutting wheel 2 is parallel with the pivotal axis of the arm 31. The disc 3 has an opening 39 accommodating the wheel 2, and the T-piece 30 and the support brackets 35 and 36 so that the cutting edge of wheel 2 projects slightly beyond the rim of the disc 3 when the arm 31 is in its fully swung out position on the disc 3 with the pivotal axis of the T-shaped piece 30, the axis of rotation of the wheel 2 and the longitudinal axis of the drawn tubing 18 in the same vertical plane as shown in FIGS. 1, 2 and 3 of the drawings.

Each subassembly also includes a coil spring 40 mounted between the arm 32 and a bracket 41 affixed to the plate 37 which urges the T-shaped piece 30 to rotate on its pivotal axis 34 in the direction of the arrow shown in FIG. 2. The pressure exerted by spring 40 on the arm 32 may be regulated by the nut and bolt arrangement shown at 42 in FIG. 2. The radial position of this entire subassembly on the disc 3 may be adjusted by the bolt 43 engaging the bracket 41 on the plate 37 and thru bracket 44 on the disc 3. A fixed collar 45 is provided on the bolt 43.

The arm 33 of the T-piece 30 has mounted thereon a cam follower 46 which engages the operative face of the stationary ring cam 47 attached to the support member 4 by the retainer ring 48 bolted to the support member 4 as shown in FIG. 2. The ring-shaped cam 47 engaged by the cam follower 46 which is urged against the operative face of the cam 47 by the spring 40 controls the swinging movement of the T-shaped piece 30 on the pivotal axis 34 and therewith the position of the cutting wheel 2 as the disc is rotated as described above. The operative face of the cam 47 is shaped as a flat spiral and gradually increases in diameter as it extends around the shaft 20 supporting the disc 3 with the part of largest diameter terminating abruptly in a step 47' (FIG. 1) which is positioned so as to allow the arm 31 to swing on its axis 34 under the pressure exerted on the arm 32 by the spring 40 at the proper moment to move the cutting wheel 2 across the drawn tubing 18 at or near the point of tangency of the tubing with the periphery of disc 3 to sever the tubing.

The cam 47 is adjustable circumferentially on the support member 4 to move the step 47' on the cam 47 with respect to the point of tangency of the tubing 18 with the periphery of disc 3 by the bracket 49 which is bolted to the cam 47 and which has a segment of gear teeth 50 on its outer end engaged by gear 51 mounted on the bracket 52 affixed to the support member 4. The gear 51 is provided with a handle 53 to effect this adjustment. The bolts of the retaining ring 48 are loosened slightly to allow the cam 47 to be adjusted. Where desired, a cam lock clamp may be used for quick release of the cam 47 for adjustment. The timing of the swinging movement of the T-piece 30 with respect to the rotation of the disc 3 thus may be changed to effect a more shallow or deeper cut in the drawing tubing 18 by changing the location at which the cutter wheel 2 scores tubing with respect to the point of tangency of the tubing with the disc 3. Thus, the cut is deepest when the location at which the tubing is scored coincides with the point of tangency of the tubing with the periphery of the disc 3 and is of decreased depth as the distance between the location of scoring and the aforesaid point of tangency is increased by adjustment of the cam 47 as described above.

In the drawings the lower cutter wheel 2 is shown at its deepest penetration into the tubing 18 and before it has completed its swinging movement in the direction of the arrow (FIG. 2) and across the tubing. On completion of its movement across the tubing the cutter wheel no longer engages the tubing and the cam follower 46 engages the spiral face of cam 47 beyond the step 47'. As the disc 3 is rotated from the position shown in FIGS. 1, 2 and 3, lower wheel 2 is gradually swung in the reverse direction against the pressure exerted by spring 40 as the cam follower 46 travels along the spiral face of cam 47. When the cam follower 46 reaches the step 47' on the cam 47 the spring 40 turns the T-piece 30 on its pivotal axis to carry the cutting wheel 2 again across the drawn tubing 18 in the direction of the arrow (FIG. 2).

The cutter wheel 2 takes a combination rolling and slashing motion across the tubing 18 to score or scratch the tubing wall. The pressure of the cutter wheel on the tubing is lowest as the wheel in its arcuate motion first engages the tubing and increases as the wheel moves toward the maximum outer diameter of the tubing. The depth of penetration of the cutting edge of the wheel 2 is adjustable by causing the wheel to lag or lead with respect to the point of tangency of the tubing 18 with the periphery of disc 3. When the cutting wheel 2 is at its deepest penetration (FIG. 2), the maximum pressure of the cutting wheel's engagement with the tubing is transmitted lengthwise through the supporting arm 31 which provides a solid support to resist the maximum pressure because the pivotal axis 34 of the T-piece 30, the axis of rotation 38 of the wheel 2 and the longitudinal axis of the drawn tubing 18 are in the same plane which plane is normal to the axis of rotation of the disc 3.

Means for wetting the cutting edges of each of the cutting wheels 2 is provided on the hub of disc 3. The wheel wetting means comprises two circular trough members 55 and 56 (FIG. 2) each providing an annular channel or trough for holding water, for example, feed tubes 57 and 58 leading into the troughs of the members 55 and 56, respectively, from water reservoirs (not shown). Capillary tubes or conduits 59 and 60 open at one end into the channels of members 55 and 56, respectively, and at the opposite end open into tubular receptacles 61 and 62, respectively, secured to the front face of the disc 3. The receptacles 61 and 62 are small tubes filled with sponge material and constitute water applicators for the cutting wheels 2. The sides of the tubes 61 and 62 are provided with V-shaped openings to accommodate the V-shaped edge portions of the cutter wheels 2. The tubes 61 and 62 are mounted on the disc 3 with the V-shaped openings therein positioned to receive the edge portions of the cutter wheels 2 in the swung out position of the wheels.

The tubing 18 is urged upward against the periphery of the disc 3 by the disc 65 which acts both as an anvil and a guide wheel for the tubing 18. The disc 65 is mounted for rotation on an arm 66 which is pivotally mounted at 67 on a bracket 68 attached to the base 1 of the severing apparatus. Between the axis of rotation 69 of the disc 65, and the pivotal axis of the supporting arm 66, a spring 70 is mounted between the bracket 68 and the arm 66 to urge the latter in an upward direction. An adjustment post 71 is provided for the arm 66 to limit the upward movement of the latter. The disc 65 is provided with a flange 72 which engages the drawn tubing 18 to hold the latter against lateral displacement when slashed by the cutting wheel 2.

The severing apparatus also includes a breaker 75 for snapping the tubing 18 at the score made by the wheel 2. The breaker 75 is mounted further along the linear path of travel of the tubing 18 than the disc 3 and includes a roller 76 mounted on the end of the arm 77 which is pivoted at 78 on the bracket 79 affixed to the base 1. The spring 80 attached to the arm 77 and to the bracket 79 as shown in FIG. 2 urges the arm 77 and therewith the roller 76 in a downward direction toward the path of travel of the tubing 18. The movements of the roller 76 in a vertical direction are controlled by the cam follower 81 mounted on the arm 77 between the roller 76 and the pivot 78. The cam follower 81 engages the face of cam 82 which is affixed to the shaft 83 journalled to the brackets 79 and 84 (FIG. 2). The shaft 83 is driven by the sprocket 85 affixed to its end opposite the cam supporting end thereof and the chain 86 which engages the sprocket 85 and the sprocket 87 (FIG. 4) on the shaft 24 carrying the sprockets for the chains 22 and 26.

The operative face of the cam 82 engaged by the cam follower 81 is in the form of a flat spiral and has a step 88 in its operative face. The spiral face of the cam 82 and the parts of the breaker actuated by the cam and the drive means for the tractor 19, the carrying disc 3 and the cam 82 are so arranged that the roller 76 is held in a position slightly above the line of travel of the tubing 18 and out of engagement with the tubing until the latter has been scored by one of the cutting wheels 2. After the tubing has been scored, the roller 76 is moved downwardly under the force of spring 80 to strike the scored length of tubing and break the tubing at the score. Preferably the blow struck by the breaker 75 takes place after the cutting wheel 2 has been moved across the tubing 18 and is no longer engaged therewith and the scored portion of the tubing has been moved slightly beyond the center of rotation of the disc 3 and the anvil disc 65 in the direction of the breaker 75. While these parts of the apparatus have not been shown in such relative positions in the drawings it will be understood that the positions of the various parts of the machine of the apparatus illustrated have been selected for clarity of illustration. It will be understood further that the aforesaid parts of the machine may be arranged so that the roller 76 of the breaker 75 will engage the tubing 18 as it is moved thereunder to exert a slight pressure on the tubing at the time the score is made. After the score has been made as described above, the roller may be moved downwardly to exert a greater pressure on the scored tubing to snap it at the score line. This arrangement of the various parts of the apparatus is advantageous when short lengths of tubing are to be severed from the continuously drawn tubing 18.

A conveyor including an endless belt 90 (FIGS. 1 and 2) is provided for carrying the length of severed tubing away from the severing apparatus. One end only of the belt and a pulley 91 therefor mounted for rotation on brackets 79 and 92 has been shown. The endless belt may be independently driven by drive means (not shown in the drawings) with the upper flight of the belt travelling in the direction of the arrow in FIG. 1 and at a speed higher than the linear speed of the severed length of tubing to effect a separation of the tube ends at the point of severance.

It is to be understood that other mechanisms may be employed for the purpose of snapping the tubing at the score and for carrying the cut sticks or lengths of tubing away from the severing apparatus.

Conventional means may be mounted between the tractor 19 and the severing apparatus for guiding drawn tubing fed to the severing apparatus and restraining the fed tubing for vertical or lateral movement out of its linear path while being severed as described above. Such guide means may include conventional guide rollers mounted so as to engage the top and the sides of the fed tubing. A guide roller of known structure is shown at 93 in FIG. 1 of the drawings by way of example. The severing apparatus is useful also for severing lengths of solid cylindrical glass rods from a continuously drawn solid cylindrical glass body.

What I claim as new and desire to secure by Letters Patent of the United States is:

1. An apparatus for severing lengths from an elongated vitreous body travelling longitudinally in a linear path, said apparatus comprising in combination:
    (a) a disc mounted for rotation on an axis transverse to said path with its periphery engageable with one side of an elongated vitreous body travelling longitudinally along said path,
    (b) a support for said disc,
    (c) means for driving said disc at a peripheral speed corresponding to the linear speed of such body,
    (d) cutter means for transversely scoring such body,
    (e) said cutter means being mounted on the peripheral portion of said disc and including an arm swung at one end on said disc with its free end extending radially outward toward the periphery of the disc and its pivotal axis transverse to the axis of rotation of the disc and in a plane including the longitudinal axis of such body and
    (f) a cutting wheel mounted for rotation on the free end of said arm with its axis of rotation parallel to the pivotal axis of said arm and its cutting edge extending beyond the periphery of said disc in the fully swung out position of said arm on said disc for scoring engagement with such body,
    (g) the pivotal axis of said arm, the axis of rotation of said wheel and the longitudinal axis of the vitreous body being in a common plane normal to the axis of rotation of said disc in the fully swung out position of said arm on said disc,
    (h) said apparatus comprising also means for swinging the arm to move the cutting edge of the cutting wheel into transverse scoring engagement across such body, and
    (i) means correlating the drive means for said disc and the means for swinging the pivoted arm to transversely score such body in the region of the point of tangency of such body with the periphery of the disc.

2. An apparatus according to claim 1 which includes means mounted on the side of the linear path away from the periphery of the disc and biased toward the disc for supporting such body in the linear path in engagement with the periphery of the disc.

3. An apparatus according to claim 2 wherein the means for supporting such body in the linear path is a flanged disc.

4. An apparatus according to claim 2 which includes breaker means mounted further along the linear path than the body support means for engagement with such body, means for driving said breaker means and means correlating the drive means for said breaker means with the drive means for said disc and the means for swinging the pivoted arm to break such body at the score.

5. An apparatus according to claim 1 wherein the support for the disc is pivoted on an axis spaced from and parallel to the axis of rotation of the disc and wherein adjustment means for the support on its pivot are provided for changing the position of the disc with respect to the linear path for adapting the apparatus for severance of such bodies of various diameters.

6. An apparatus according to claim 1 wherein the means for swinging the arm includes a stationary ring cam mounted on the support and having a flat spiral operative face providing a step at the end of the spiral, a cam follower engaging the operative face of the cam and mounted on a lateral extension of the arm, means for urging the cam follower against the operative face of the cam and means for adjusting the position of said step with respect to the point of tangency of such body with the periphery of said disc to change the depth of the score.

7. An apparatus according to claim 1 which includes means for wetting the cutting edge of said wheel including an applicator mounted on the peripheral portion of said disc and intersecting the arcuate path of movement of said cutting edge for wetting engagement with said edge, an annular trough for wetting fluid mounted on the hub of said disc and fluid conduit means opening into said trough and said applicator.

References Cited in the file of this patent
UNITED STATES PATENTS

| | | |
|---|---|---|
| 1,220,201 | Danner | Mar. 27, 1917 |
| 1,284,035 | Anderson | Nov. 5, 1918 |
| 2,833,024 | Boehm | May 6, 1958 |
| 2,839,872 | Cline | June 24, 1958 |
| 2,871,622 | Singer et al. | Feb. 3, 1959 |
| 2,981,135 | Small | Apr. 25, 1961 |